(12) United States Patent
Denoue et al.

(10) Patent No.: US 7,543,248 B2
(45) Date of Patent: Jun. 2, 2009

(54) USER-MACHINE INTERFACE

(75) Inventors: Laurent Denoue, Palo Alto, CA (US);
Patrick Chiu, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 527 days.

(21) Appl. No.: 11/139,597

(22) Filed: May 31, 2005

(65) Prior Publication Data

US 2006/0271521 A1 Nov. 30, 2006

(51) Int. Cl.
*G05F 7/00* (2006.01)

(52) U.S. Cl. ..................... 715/863; 715/857

(58) Field of Classification Search .............. 715/864, 715/851, 856, 857, 859
See application file for complete search history.

(56) References Cited

U.S. PATENT DOCUMENTS 6,683,600 B1 * 1/2004 Lui ........................ 345/179
6,976,217 B1 * 12/2005 Vertaschitsch et al. ...... 715/717
2005/0034080 A1 * 2/2005 Jaeger ........................ 715/767
2006/0085767 A1 * 4/2006 Hinckley et al. ............ 715/863

OTHER PUBLICATIONS

Accot et al; "More than dotting the I's—Foundation for crossing-based interfaces"; IBM Almaden Research Center; Paper: Smooth Moves; CHI2002; vol. 4, Issue No. 1; pp. 73-80; Apr. 20-25, 2002.
Denoue et al; "Shared Freeform Input for Note Taking across Devices"; FX Palo Alto Laboratory; Short Talk: Interaction Techniques for Handheld Devices; CHI 2003; pp. 710-711; Apr. 5-10, 2003.

* cited by examiner

*Primary Examiner*—Doug Hutton
*Assistant Examiner*—Daeho D Song
(74) *Attorney, Agent, or Firm*—Sughrue Mion, PLLC (57) ABSTRACT

A user-machine interface is disclosed that uses a line to connect and/or to intersect various objects displayed on a screen. A start of the line may identify a source, an end of the line may identify a sink, and line shapes and/or objects intersected by the line may identify commands.

21 Claims, 11 Drawing Sheets

USER-MACHINE INTERFACE

BACKGROUND

User-machine interface has made great strides with the introduction of icons displayed on a screen and a mouse manipulating a pointer. As is well known, icons may be "grabbed" by pointing a mouse, click and hold, and moving the icon anywhere on a screen. For example, if the icon is moved into a "shredder" icon, the icon or the document represented by the icon may be deleted.

SUMMARY

A user-machine interface is disclosed that relies on the use of a line, having a start and an end, that connects various objects displayed on a screen. The line may start at a source object, extend to intersect other objects, and end at some desired location on the screen. A location of the start of the line may identify a specific portion of the source object as a source. If the line extends to intersect a command object, then the source may be used as input to a command corresponding to the command object for processing. If the line ends at a sink object, the processed source may be placed at a location indicated by the end of the line. If the end of the line cannot be associated with an object, then the processed data may simply be displayed at a location of the end of the line, for example.

The line may include various line shapes. For example, if the line starts by substantially surrounding a portion of the source object, that portion surrounded by the line is identified as the source to be processed by later commands. The line shape at the start of the line may also imply commands that should be performed on the source. For example, if the start crosses out a word of the source object in a particular direction such as from right to left, this line shape may command cutting the word from the source object.

The line may extend into a line shape that does not intersect with any object. Such line shapes may be interpreted as commands. For example, a simple loop may indicate the "insert" command, for example. Thus, if the line starts with a straight line crossing out a word in a source object, extends into a loop, and ends at a particular point in a sink object, then the word in the source object may be cut and inserted at a location indicated by the end of the line.

Objects may be one or more sources, sinks or commands. Command icons may be simply a line (a command bar) drawn across the screen, to separate the screen into two portions, for example. A line drawn starting from one portion of the screen, crossing the command bar into another portion of the screen may indicated copying (or cutting) text from the first portion of the screen into the second portion of the screen, for example. Source and sink objects may be of any kind and not limited to text. For example, source and sink objects may be network related such as email addresses, cell phone numbers, TV or radio stations, for example. Further, commands may also be non-text related such as voice synthesizers, video displays, headphones, etc.

In view of the above, instead of entering commands via keyboard or using a mouse, drawing of a substantially contiguous line to form various shapes and intersecting various objects provides an intuitive and simple method for communicating with a machine. Such a user-machine interface may be easily adaptable to any type of devices including xerographic devices such as copiers or printers with display command entry areas, hand-held units such as PDAs, cell phones, etc.

BRIEF DESCRIPTION OF THE DRAWINGS

Various disclosed exemplary embodiments of the system and methods will be described in detail, with reference to the following figures, wherein.

DETAILED DESCRIPTION OF EMBODIMENTS

Figure 1:
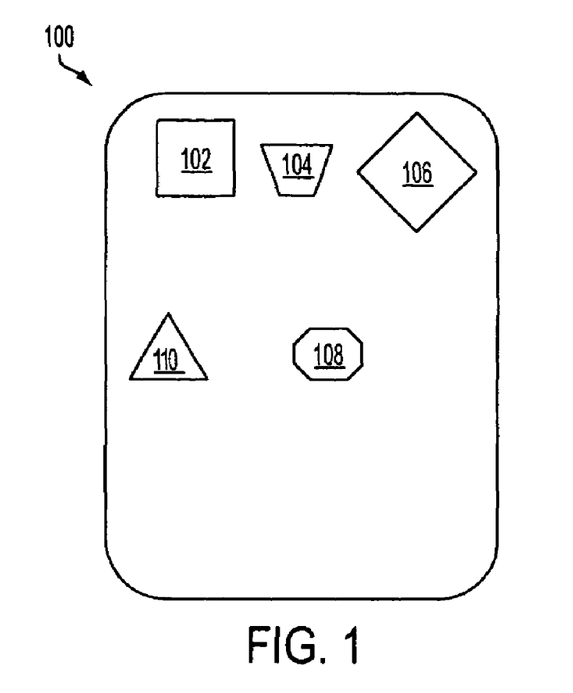
FIG. 1 shows an example of a display screen displaying objects.

FIG. 1 shows an exemplary display screen 100 that displays objects 102-110. For this example, objects 102-106 are source/sink objects and objects 108 and 110 are command objects. Source/sink objects 102-106 may represent documents/files/ports/network connection, etc., to or from which data may be input and/or output. Command objects 108-110 may represent actions that may be performed relative to source/sink objects 102-106 or data within them.

Figure 2:
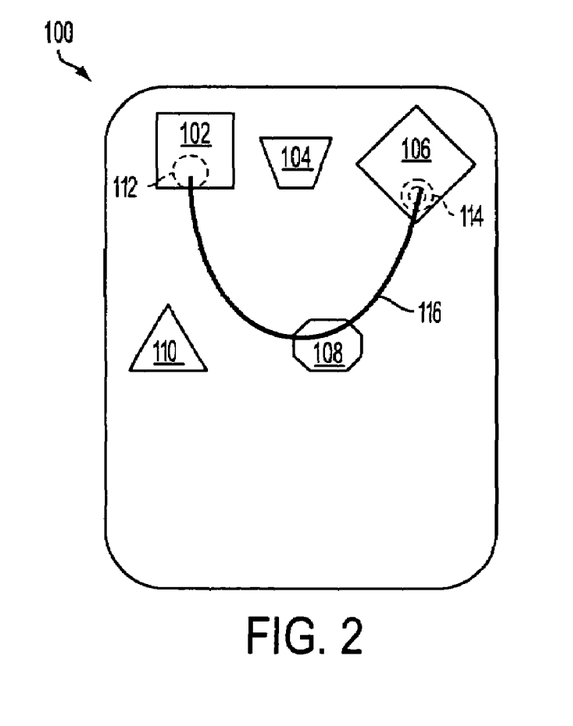
FIG. 2 illustrates an example for entering a command by connecting various objects using a line.

For example, FIG. 2 shows a substantially contiguous line 116 that begins at object 102, intersects object 108 and ends at object 106. The substantially contiguous line 116 may be formed by ordinary means such as a pointer or a stylus using a touch sensitive screen, for example. These and other methods for forming a line may involve small gaps in the line. In any case, any gaps in the line must be of a small enough magnitude for the appropriate technology to distinguish one line from multiple lines. A dashed circle 112 is used to identify the start of line 116, and a double dashed circle 114 is used to identify the end of line 116. The dashed circle and double dashed circle 112 or 114 may not be actually displayed but are used here to indicate starts and ends of lines. The intersection of line 116 with object 108 may be crossing object 108 as shown in FIG. 2, or parameters may be set so that line 116 may only need to come within a certain set distance of object 108 to be interpreted as intending to include object 108.

Line 116 represents a command to direct a machine to perform a function as represented by object 108 using object 102 or a portion of object 102 as input and placing the output in object 106. Thus, instead of using a pointer and a mouse, for example, to select object 102, and dragging object 102 to object 108 for a function to be performed, line 116 is actually drawn as a visible entity that connects source/sink objects with command objects.

Figure 3:
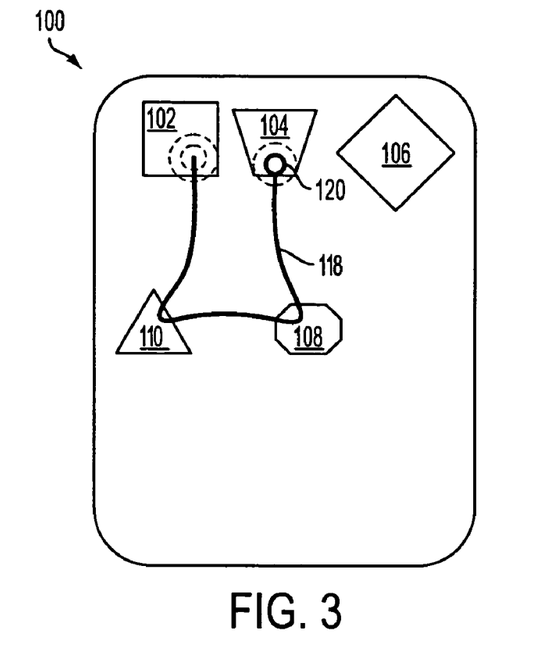
FIG. 3 illustrates an example of using a specific shape of the line for specifying parameters of a command.

FIG. 3 shows another example where a line 118 includes a line shape 120 at the source end and connects two command objects 108 and 110 before reaching the sink object 102. As shown in FIG. 3, line shape 120 may have a substantially closed perimeter surrounding a portion of object 104 to identify the source. It is immaterial whether the closed perimeter is completely closed. The purpose of the substantially closed perimeter is to unambiguously identify the source. Any shape sufficient for performing the identification function is acceptable.

The functions to be performed on the identified source is a combination of two functions as represented by command objects 108 and 110. The results after performing functions associated with command objects 108 and 110 may be placed in the object 102 at a location identified by the end of line 118. The commands 108 and 110 may be performed in the order from source to sink along line 118. Other order schemes may be constructed such as resolving order based on types of command objects included by line 118.

Figure 4:
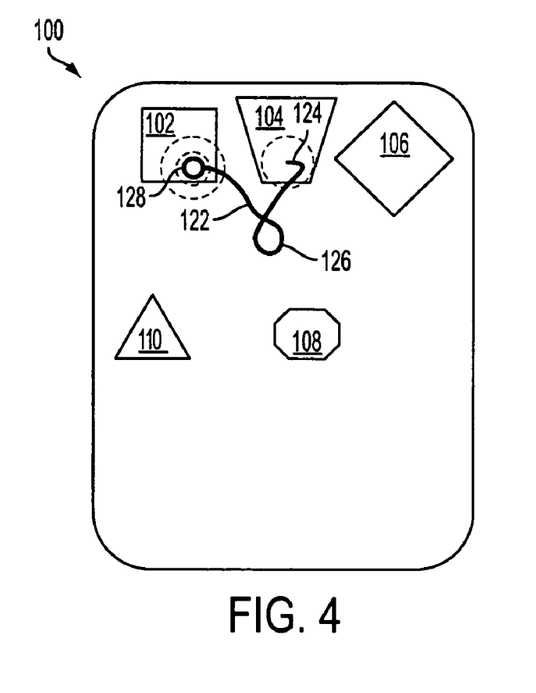
FIG. 4 illustrates another example of using shapes in a line for specifying a command and/or parameters of a command.

FIG. 4 shows another example in which line 122 includes line shapes 124, 126 and 128. Similar to line shape 120, line shape 124 may identify a source data, and, additionally, specify a function such as copy or cut, for example. Line 122 does not cross a command object relative to the source. Instead, line shape 126 is included and may be interpreted to be with a predefined function. Further, line shape 128 specifies not only a location where the processed results should be placed, but also a specific space within which the process results should fit by adjusting text reflow, size, etc., for example. Thus, using line shapes 124, 126, and 128, the data in object 104 may be identified and processed via the function identified by line shape 124 and line shape 126, and the result placed in object 102 at the location identified by line shape 128. Multiple line shapes may also be included to specify additional commands. For example, if the source data is to be copied, put into bold font with underline, then two different line shapes, one for bold and one for underline, may be used instead of the one line shape 126.

Figure 5:
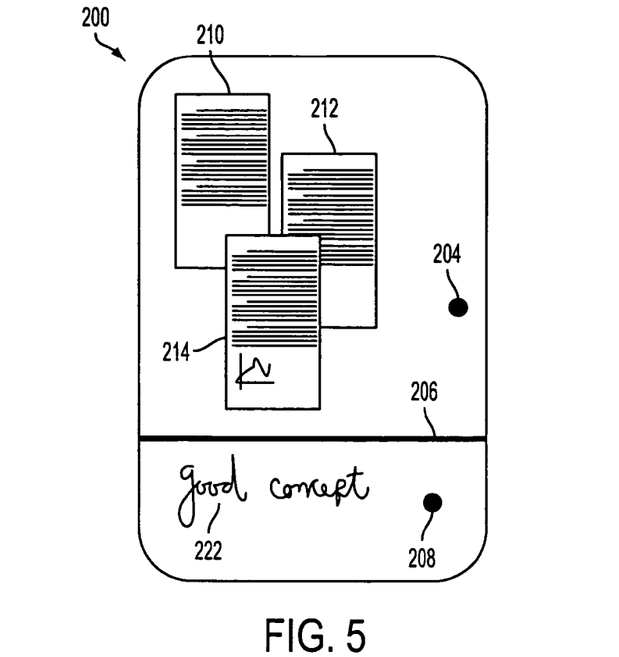
FIG. 5 illustrates an example of a display screen divided by a command bar.
Figure 6:
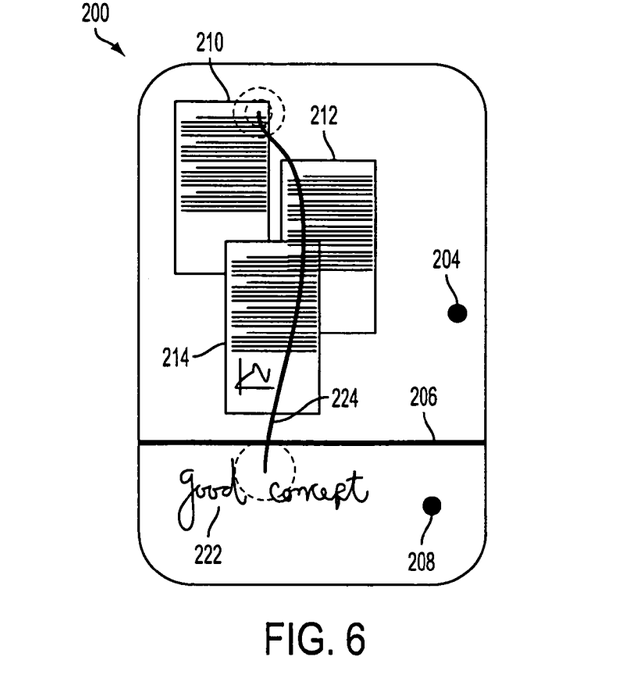
FIG. 6 illustrates an example of entering a command by drawing a line that crosses the command bar.
Figure 7:
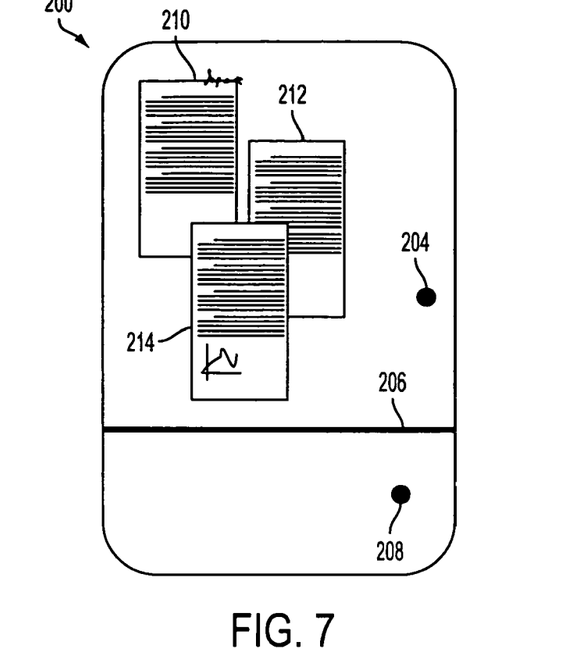
FIG. 7 shows an exemplary result of the command shown in FIG. 6.

FIG. 5 shows an example display screen 200 that includes a display section 204, a command bar 206 and a display section 208. Display sections 204 and 208 may be touch sensitive, for example, to facilitate use of a stylus. Other ways of drawing a line and line shapes are well known, such as, for example, using a mouse or keys of a keyboard other than touch sensitive screens. The command bar 206 is a type of command object and a command is "entered" by extending a line to cross command bar 206. FIG. 5 may represent an example in which a user may be reviewing documents 210-214 using a PDA or cell phone, for example, and decides to enter an ink comment 222 such as "good concept." Then, the user may want to place the comment at a particular location of document 210. Thus, as shown in FIG. 6, the user may use a stylus to draw line 224 starting at ink comment 222 and ending at a position that ink 222 comment should be placed in document 210. Upon receiving line 224, a command processor may cut ink comment 222, size it based on the display size of document 210 and place the sized ink comment at the location indicated by the end of line 224 as shown in FIG. 7.

Figure 8:
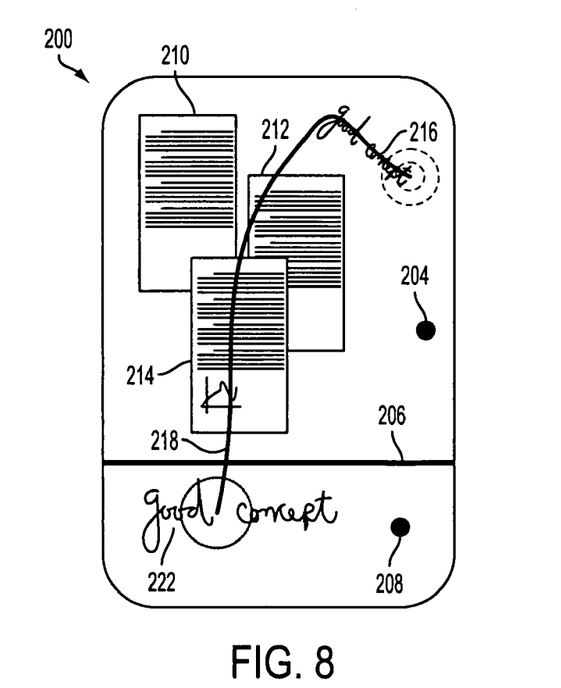
FIG. 8 shows an example of a line shape at an end portion of the line acting as a command.
Figure 9:
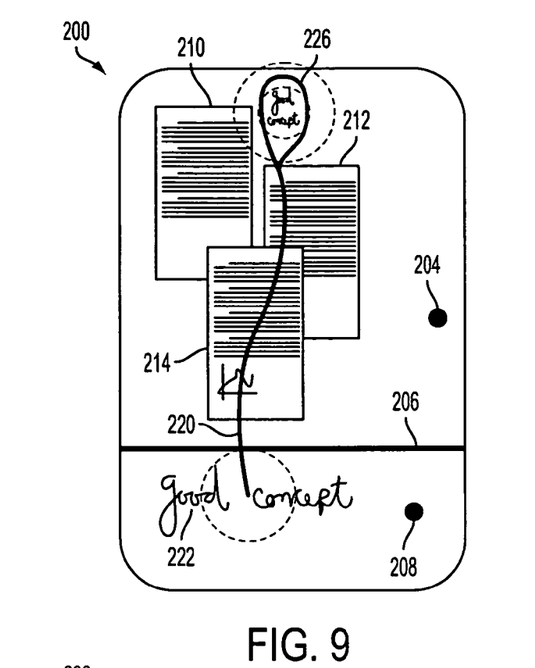
FIG. 9 shows another example of a line shape that specifies and output placement.
Figure 10:
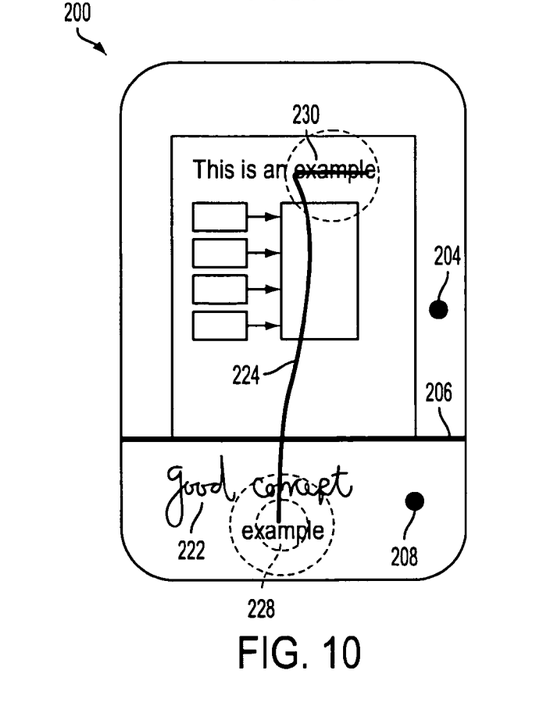
FIG. 10 shows an example of a line shape at the start to specify a command.
Figure 11:
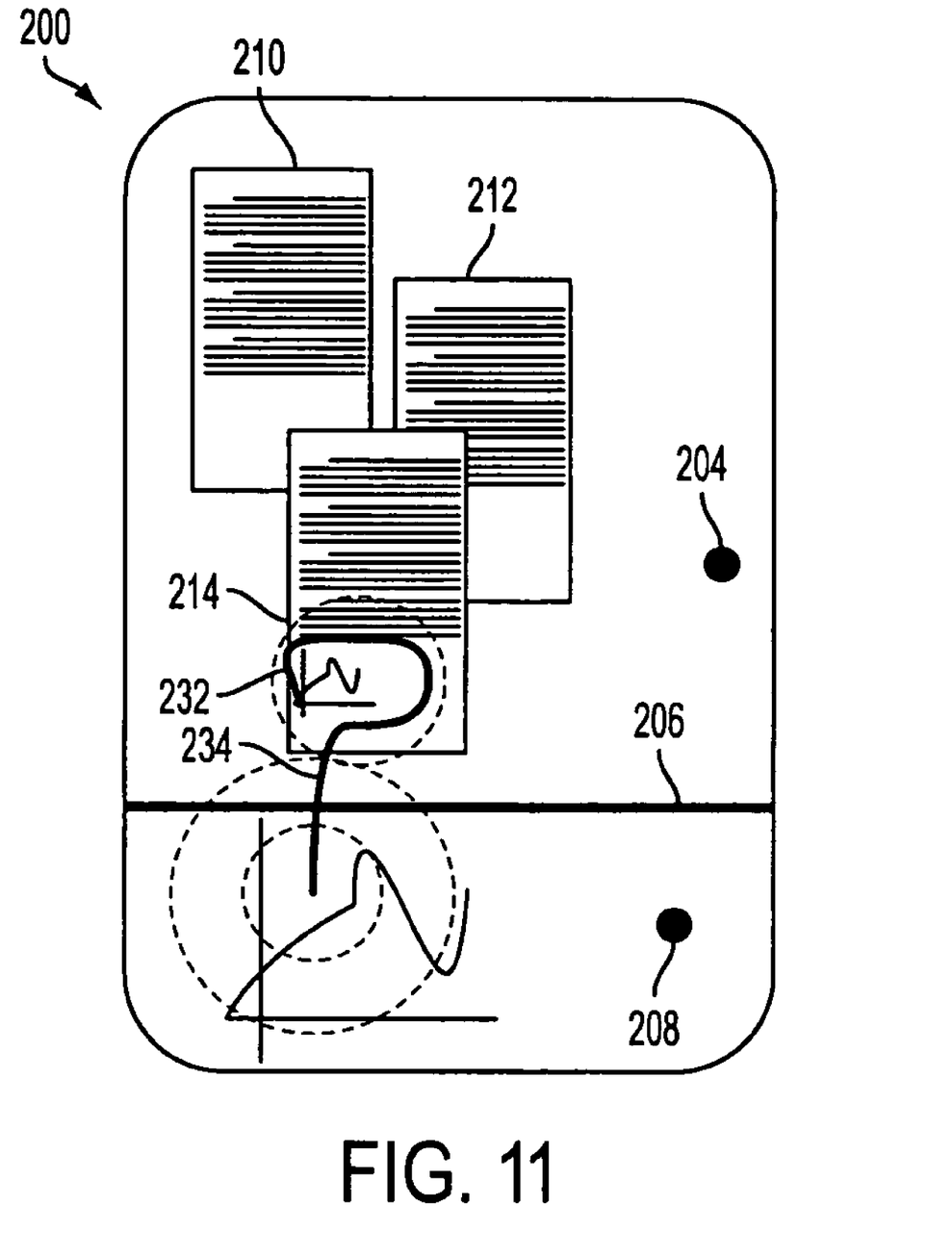
FIG. 11 shows another example of a line shape command at the start.

FIG. 8 shows a line shape 216 at the end of line 218 that indicates how to place ink comment 222. FIG. 9 shows another example in which line 220 starts at ink comment 222 and ends in a substantially closed perimeter line shape 226 to specify where and how ink comment 222 is to be placed. As shown, ink comment 222 is reflowed and sized to fit into space substantially encompassed by line shape 226. FIG. 10 shows yet another example of a line shape 230 that identifies the word "example" as source data to be copied to a position below ink comment 222. In this case, line shape 230 is interpreted as a "copy". The command processor could be set to interpret line shape 230 as a "cut" if it crosses the word "example" from left to right instead of right to left, for example. FIG. 11 shows an example of a substantially closed perimeter line shape 232 that encompasses a graph in document 214 and making a copy (or moving it) to display section 208 via line 234.

Figure 12:
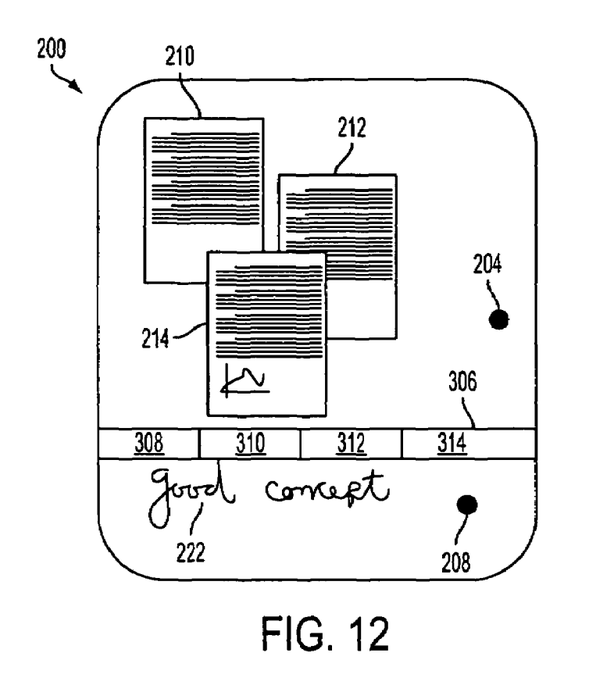
FIG. 12 shows an example of fields in a command bar.

FIG. 12 shows a command bar 306 that includes fields 308-314. Each of fields 308-314 may be defined to represent possible functions that may be either predetermined or set by the user directly or set using a profile, for example. While FIG. 11 identifies fields 308-314 as labeled rectangles, these fields may be identified via color, icon or other convenient and meaningful symbols familiar to the user.

Figure 13:
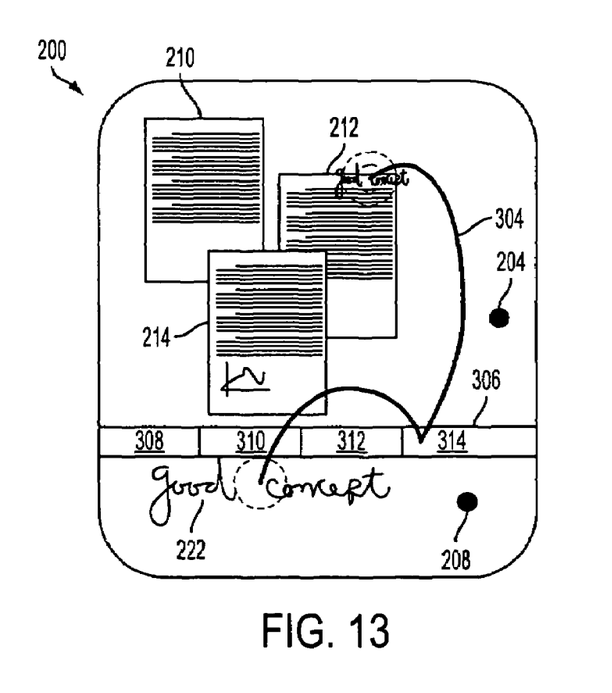
FIG. 13 shows a command entered by drawing a line that intersects multiple fields in a command bar.

In FIG. 13, a line 304 starts at ink comment 222, intersects fields 310 and 314 and ends at document 212. Fields 310 and 314 may identify other accessible machines to which ink comment 222 may be transmitted. For example, fields 310-314 may represent colleagues of the user. Thus, the user forming line 304 transmits ink comment 222 to colleagues corresponding to fields 310 and 314 to communicate the approval. Colleagues corresponding to fields 308 and 312 do not receive ink command 222, even if viewing document 212. If colleagues corresponding to fields 310 and 314 are also viewing document 213, then the ink comment may be placed in the colleagues copy of document 212 at the location indicated by the user.

Figure 14:
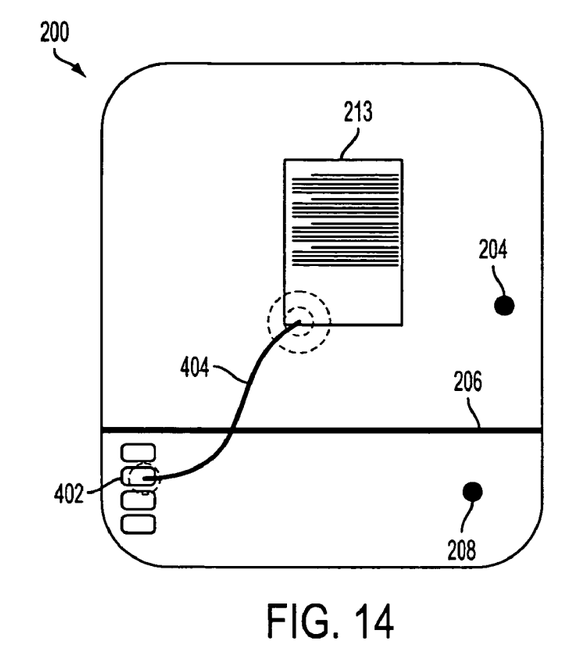
FIGS. 14 and 15 illustrate an example of entering a command relative to functions such as sending or receiving email or instant messaging.
Figure 15:
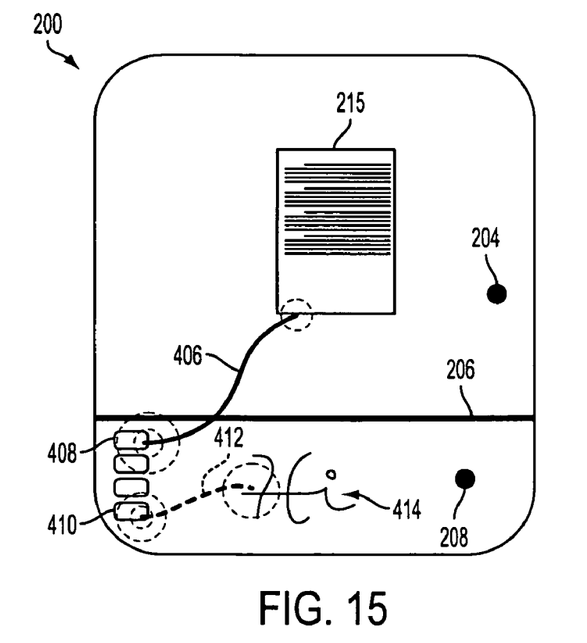

While examples shown in FIG. 5-FIG. 13 show ink comment 222 in display section 208, other types of objects may be placed there. For example, FIG. 14 shows email 402 as a source object, and line 404 starting at email 402, and ending at a desired location in display section 204. Line 404 crossing command bar 206 may be interpreted as a command to receive email 402 and display its contents as a document 213 in display section 204. FIG. 15 shows an example in which the user may place line 406 starting at document 215 and ending at sink object 408. Sink object 408 may be a "send" object that may be initialized to send email and/or facsimile via a network connection, for example, to addresses listed in an associated address file. Thus, line 406 may correspond to a command to send document 215 as email to addresses indicated in the address file. Additionally, FIG. 15 shows another line 412 that starts at ink comment 414 and ends at sink object 410 that may represent an instant message session. Thus, line 412 commands sending ink comment 414 to instant message(s) partner associated with object 410. The instant message session may automatically display message inputs so that the user need not explicitly "receive instant messages."

Figure 16:
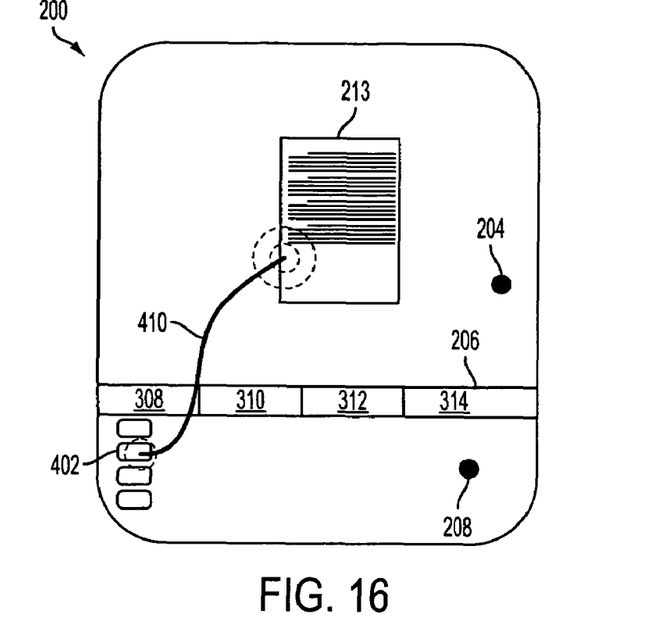
FIG. 16 illustrates using fields in a command bar for the functions illustrated in FIGS. 14 and 15.

FIG. 16 shows command bar 206 replaced by command bar 306, and email 402 is opened and displayed in display section 204. Field 308 may represent "self" or "personal" and the email is not sent to any other party. Other network type communications may also be possible such as receiving or sending audio files, video clips, TV or radio stations, Internet connections or communications with cell phones via text-to-voice or voice-to-text, etc.

Figure 17:
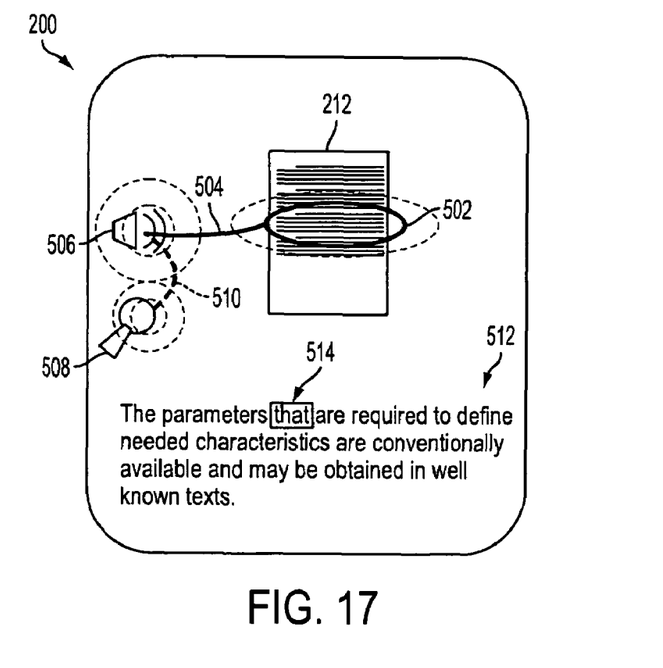
FIG. 17 illustrates an example of commanding multiple functions using a single line.

As discussed in connection with FIGS. 1-4, command objects may be in any shape and not limited to command bars 206 and 306 as discussed in connection with FIGS. 5-16. For example, FIG. 17 shows command objects 506 and 508 in shapes of familiar icons. Command object 506 may be a voice synthesis icon that performs text-to-voice conversion to enunciate text. Command object 508 may be a magnifier command that displays, in magnified fashion, the selected text.

As shown in FIG. 17, line 504 includes line shape 502 that identifies a particular paragraph in document 212. Line 504 may end at command object 506. In this case, the machine inputs the selected text into a voice synthesizer and generates audio output to "read" the selected text. If the user further extends line 504 with line portion 510 shown as a dashed line to end at command object 508, the selected text may be also displayed in portion 512 of display screen 200, for example, and the word currently enunciated may be highlighted as shown by highlight 514. In this way, a user of a hand-held unit with limited display space and resolution may have a portion of a displayed document read audibly and, if desired, the portion of the document may be displayed for confirmation. A headphone icon may be used if audio is output to a headphone for privacy.

Figure 18:
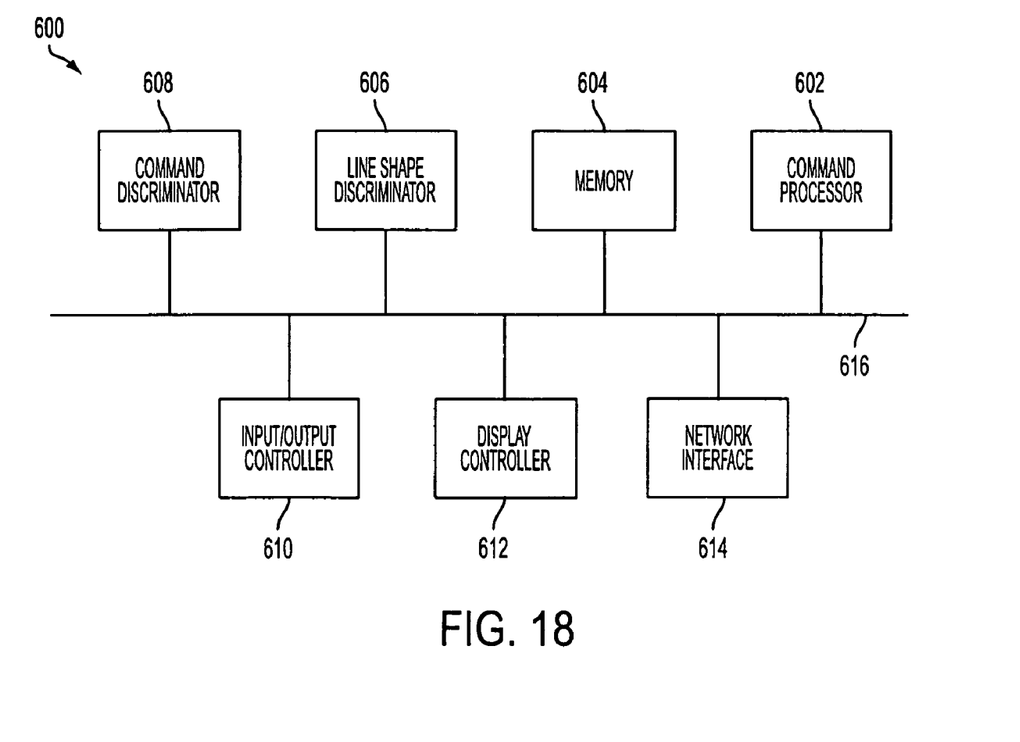
FIG. 18 shows an exemplary block diagram of a machine.

FIG. 18 shows an exemplary block diagram of a machine 600 that may perform the functions in connection with entering commands via lines as discussed above. Machine 600 may include a command processor 602, a memory 604, a line shape discriminator 606, a command discriminator 608, an input/output controller 610, a display controller 612 and a network interface 614. These components 602-614 may be coupled together via one or more buses 616.

While FIG. 17 shows machine 600 configured in a bus architecture format, other architectures may be used as is well known to one of ordinary skill. Additionally, while separate blocks are used to illustrate various functional units, these blocks may be combined or further divided based on available technology. Hardware implementation such as application specific integrated circuits (ASCIs) or software implementations using either general or application specific processors such as DSPs may be used.

After power on, input/output controller 602 monitors whether a user has entered a line input. Input/output controller 610 may be fast enough to detect in real time a stylus or finger, for example, has contacted a touch screen and follows the movements of the stylus in real time to determine whether a line is being input and whether objects are being crossed. When input/output controller 610 determines that a line has ended, the entered information may be sent to line shape discriminator 606 to determine whether particular line shapes have been drawn. Line shapes may also be determined in real time. If line shapes have been drawn, line shape discriminator 606 may convert various line shapes into codes, for example, and the line shape codes sent to command discriminator 608 to determine what command the user has entered.

Command discriminator 608 may transmit the commands to command processor 602 which in turn may access information from memory 604, process source data based on the commands, and output processed data into appropriate portions of memory 604. If the user commands require access of network resources, command processor 602 may access such resources via network interface 614. After the commands have been processed, command processor 602 may update display screen via display controller 612 to provide feedback to user of results of executed commands.

Figure 19:
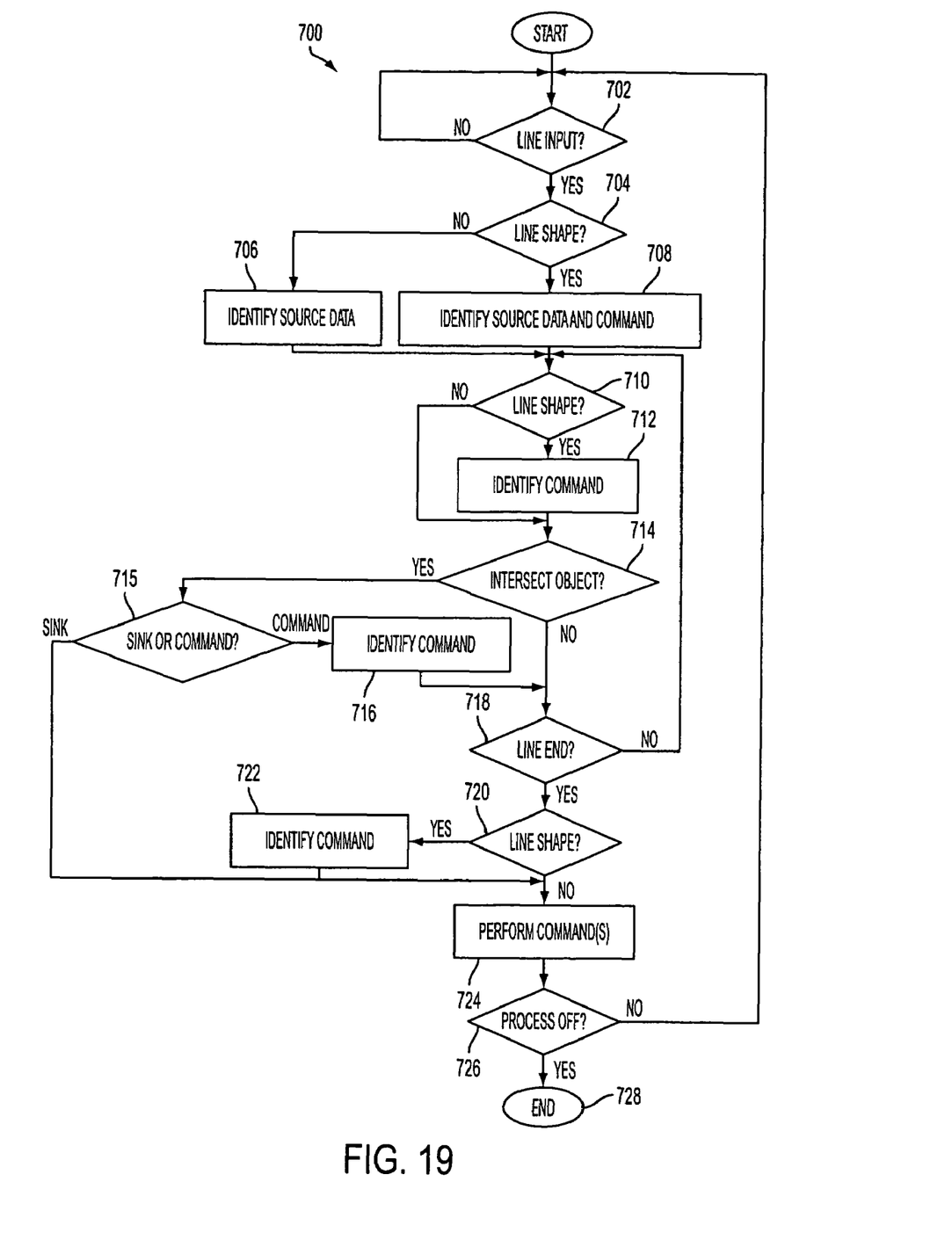
FIG. 19 shows a flowchart of an exemplary process.

FIG. 19 shows a flowchart 700 of an exemplary process for processing lines as discussed above. For convenience of discussion, flowchart 700 assumes that the process is fast enough to follow in real time a stylus using a touch screen to enter commands, as an example.

After power on, the process starts by going to step 702 and determines whether a line input has begun. If a line input has begun, the process goes to step 704; otherwise, the process returns to step 702. In step 704, the process determines whether a line shape has been entered. If a line shape was entered, the process goes to step 708; otherwise, the process goes to step 706. In step 706, the process identifies a source for data based on the location of the start of the line. For example, if the line starts at an input area such as display section 208, the complete ink comment 222 may be determined to be the source. As discussed above, other types of icons may be used that may represent email, facsimile, instant messenger, etc., which may be selected by the start of the line.

In step 708, the process identifies the source based on the particular line shape entered and whether a command is also included. For example, if the line shape substantially surrounds a paragraph of a document, then the complete paragraph may be identified as the source data. If the line shape is a substantially straight line crossing out particular portions of an underlying text, then such text may be either copied or cut as determined by various parameters that may be initialized.

After step 706 or 708, the process goes to step 710. In step 710, the process determines whether a line shape is input that is not associated with a source/sink object. If such a line shape is entered, the process goes to step 712; otherwise, the process goes to step 716. In step 712, the process determines the type of line shape entered and identifies a command associated with the entered line shape. If no command is associated with the line shape, then the process may assume that a command was not intended and goes to step 716 without identifying a command, for example. In step 714, the process determines whether the line intersected an object. If the line intersected an object, the process goes to step 715; otherwise, the process goes to step 718. In step 715, the process determines whether the intersected object is a command or a source/sink object. If the object is a sink object, then the process goes to step 724; otherwise, the process goes to step 716. In step 716, the process identifies the command and queues the command for processing at an appropriate time and goes to step 718.

In step 718, the process determines whether the line has ended. If the line ended, the process goes to step 720; otherwise, the process returns to step 710. Thus, the process may accept multiple line shape/line-object sequences to perform complex functions. For example, the user may extend a line to surround particular text of an object to identify it as a source; then the line may further extend into another line shape that may be interpreted as a bold command so that the prior selected text is converted into bold font; then the line may further extend into another line shape that italicizes the selected text, and then the line may end at a sink object identifying a specific location so that the bolded and italicized selected text is placed at the identified location in the sink object. Thus, multiple commands may be selected to achieve combinations of operations that result in a complex process.

After step 118, the process goes to step 720. In step 720, the process determines whether a line shape has been entered at the end portion of the line. If a line shape was entered, the process goes to step 722; otherwise, the process goes to step 724. In step 722, the process identifies the command indicated by the line shape such as identifying a specific location to place the results of the commands. After step 722, the process goes to step 724. In step 724, the process may perform the commands identified by the line. While flowchart 700 indicates that commands are performed in step 724, depending on the type of command, the commands may be performed as they are identified or when all needed information is available. After step 724, the process goes to step 726. In step 726, the process determines whether the process has been turned off. If the process is turned off, the process goes to step 728 and ends; otherwise, the process returns to step 702 to detect whether a new line entry has begun.

The above-described user-machine interface may be applied in any context where a display screen is used. For example, in xerographic machines such as printers or copiers, a command panel is often available and may use the line system described above. When PDAs or cell phones are used, touch sensitive screen technology may be used so that a stylus or a user's finger, a pencil, etc., may be used to draw lines for interface with these small types of machines.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A user-machine communication method that receives user inputs and performs actions based on the user inputs, the machine including a display, the method comprising:
    displaying at least two objects including data objects and command objects;
    receiving an ink line input by a user, the ink line connecting the a first object to a sink location on the display and crossing a second object, the first object being one of the data objects and the second object being one of the command objects performing a command when the ink line crosses the second object; and
    displaying a result of the command at the sink location, wherein the data objects and the command objects are displayed before the receiving of the ink line input by the user.

2. The method of claim 1, further comprising:
    displaying a third object, being a data object, at the sink location;
    placing a start of the line at the first object;
    identifying a source based on the start of the line;
    placing an end of the line at the third object; and
    identifying a sink based on the end of the line.

3. The method of claim 2, further comprising:
    forming a first line shape as the start of the line; and
    disposing the first line shape in a first position relative to the source.

4. The method of claim 3, further comprising:
    identifying a source command associated with the first line shape; and
    processing the source based on the source command.

5. The method of claim 4, further comprising:
    associating a start point with selecting the first object;
    associating a first substantially closed perimeter with selecting data substantially within the first substantially closed perimeter as the source; associating a first substantially straight line overlaying text with selecting the text as the source; and
    associating extending the first substantially straight line from left to right with copying the source and extending the first substantially straight line from right to left with cutting the source, or associating extending the first substantially straight line from left to right with cutting the source and extending the first substantially straight line from right to left with copying the source.

6. The method of claim 2, further comprising:
    identifying a source command associated with the first object; and
    performing the source command to obtain the source.

7. The method of claim 6, the source command comprising one or more of:
    receiving email;
    receiving a facsimile;
    receiving public broadcast information including TV or radio broadcast;
    receiving a download; or
    receiving a telephone call.

8. The method of claim 2, further comprising:
    forming a second line shape as The end of the line;
    disposing the second line shape in a second position relative to the sink; and
    disposing a result of the command at the sink.

9. The method of claim 8, further comprising:
    identifying a sink command associated with the second line shape; and
    processing the result based on the sink command.

10. The method of claim 9, further comprising:
    associating a end point with placing the result at a location associated with the end point;
    associating a second substantially closed perimeter with placing the result substantially within the second substantially closed perimeter; and
    associating a second substantially straight line with placing the result in an orientation and position of the second substantially straight line.

11. The method of claim 8, further comprising:
    identifying a sink command associated with the third object; and
    performing the sink command to dispose the result.

12. The method of claim 11, the sink command comprising one or more of:
    sending the result as an email; sending the result as a facsimile;
    sending the result as an instant message; uploading the result;
    displaying the result;
    outputting the result for subsequent commands;
    generating an audible sound based on the result;
    voice synthesizing the result; or
    magnifying the result.

13. The method of claim 1, further comprising:
    intersecting the line with a third object; and
    performing a command associated with the third object as the command.

14. The method of claim 13, the command associated with the third object comprising one or more of:
    moving the source to the sink;
    modifying the source based on parameters associated with the third object; and
    outputting the modified source as an object result.

15. The method of claim 14, further comprising:
    a. intersecting the line with a next object;
    b. modifying the next object result based on a command associated with the further object;
    replacing the next object result with the modified next object result; and
    repeating a and b above until the end of the line is reached.

16. The method of claim 1, further comprising:
forming a third line shape; and
performing a command associated with the third line shape as the command.

17. A machine, comprising:
a display screen for displaying objects;
a line forming means for drawing a line having a start at a first displayed object and an end at a second displayed object and substantially crossing a displayed command object along a path from the first displayed object to the second displayed object, the first displayed object and the displayed command object being displayed on the display screen prior to input of the line;
a command identifying means for associating the displayed command object with a corresponding command;
a line shape identifying means for associating line shapes at the start, the end and a portion of the line between the start and the end of the line with corresponding commands; and
a hardware means for executing the commands that correspond to one or more of the line shapes and to the displayed command object, wherein a line shape at the end of the line further indicates placement of a result of the commands at the second displayed object.

18. An apparatus that performs the method of claim 1, comprising: one or more of:
a xerographic copier;
a xerographic printer;
a personal digital assistant;
a cell phone;
a personal computer; or
a workstation.

19. A method for performing a function at a machine including a display, the method comprising:
displaying objects including data objects and command objects on the display;
receiving only one ink line as user input, the ink line starting at a first object and crossing one or more third objects before ending at a sink location on the display, wherein the first Object is one of the data objects and the one or more third objects is one or more of the command objects;
performing the function on the first object, the function commanded by the third objects; and
displaying a result of the function substantially at the sink location, wherein the data objects and the command objects are displayed on the display before the receiving of the only one ink line as the user input.

20. The method of claim 19, further comprising:
displaying a second object at the sink location; and
displaying the result of the function substantially at the second object.

21. The method of claim 19, further comprising:
wherein the one or more third objects are displayed on a command bar on the display, the command bar including one or more fields, each of the fields corresponding to one of a plurality of functions, and
wherein the ink line communicates the command to perform one or more selected functions, from among the plurality of functions, to the machine by crossing the command bar at the fields corresponding to the selected functions.

* * * * *